(12) United States Patent
Tagami

(10) Patent No.: US 9,348,100 B2
(45) Date of Patent: May 24, 2016

(54) OPTICAL COMMUNICATION MODULE

(71) Applicant: Kabushiki Kaisha Toshiba, Minato-ku, Tokyo (JP)

(72) Inventor: Yuichi Tagami, Fukuoka-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 27 days.

(21) Appl. No.: 14/310,641

(22) Filed: Jun. 20, 2014

(65) Prior Publication Data

US 2015/0234136 A1 Aug. 20, 2015

(30) Foreign Application Priority Data

Feb. 19, 2014 (JP) ................. 2014-029157

(51) Int. Cl.
*G02B 6/42* (2006.01)
*G02B 6/38* (2006.01)
*G02B 6/43* (2006.01)

(52) U.S. Cl.
CPC .............. *G02B 6/423* (2013.01); *G02B 6/3871* (2013.01); *G02B 6/43* (2013.01)

(58) Field of Classification Search
CPC .................. G02B 6/423–6/4231; G02B 6/3871
See application file for complete search history.

(56) References Cited

U.S. PATENT DOCUMENTS 4,997,254 A * 3/1991 Ganev .................. G02B 6/4226 385/33
6,550,977 B2 4/2003 Hizuka

FOREIGN PATENT DOCUMENTS

| JP | 11-194231 A | 7/1999 |
| JP | 11-237511 A | 8/1999 |
| JP | 2001-208935 A | 8/2001 |

* cited by examiner

*Primary Examiner* — Jerry Rahll
(74) *Attorney, Agent, or Firm* — White & Case LLP

(57) ABSTRACT

According to one embodiment, an optical communication module includes an optical unit and an optical connector. The optical unit includes an optical semiconductor element and a base. The optical semiconductor element has a first optical axis. The base has a first surface and a mounting portion to mount an optical connector. The first surface is perpendicular to the first optical axis. The base is provided with the optical semiconductor element. The optical connector is mounted at the mounting portion and is capable of rotating around the first optical axis. The optical connector includes a first housing and a light-guiding body. The first housing has a second surface facing the first surface and a second axis crossing the first optical axis at a first angle. The light-guiding body is provided inside the first housing and has an end plane perpendicular to the second axis.

14 Claims, 18 Drawing Sheets

H1<H3<H1+H2≦H4

OPTICAL COMMUNICATION MODULE

CROSS REFERENCE TO RELATED APPLICATION

This application is based upon and claims the benefit of priority from the prior Japanese Patent Application No. 2014-029157, filed on Feb. 19, 2014, the entire contents of which are incorporated herein by reference.

FIELD

Embodiments described herein relate basically to an optical communication module.

BACKGROUND

Optical communication modules serving as photoelectric conversion elements are embedded into communication devices. The optical communication modules include optical transmitter/receiver modules.

In the background art, an optical communication module is anchored to an internal circuit board with an optical connector facing outward to connect communication devices with each other.

An optical fiber makes use of total reflections at an interface between a clad and a core in order to transmit light therethrough, and has a minimum bending radius that has been determined in order to reduce an optical transmission loss.

When connecting internal circuit boards with each other using optical fibers, the optical fibers need to be laid in the communication devices so as to have a bending radius larger than the minimum bending radius.

Unfortunately, the bending radius of the optical fibers therefore tends to prevent miniaturization of the communication devices.

DETAILED DESCRIPTION

Figure 1:
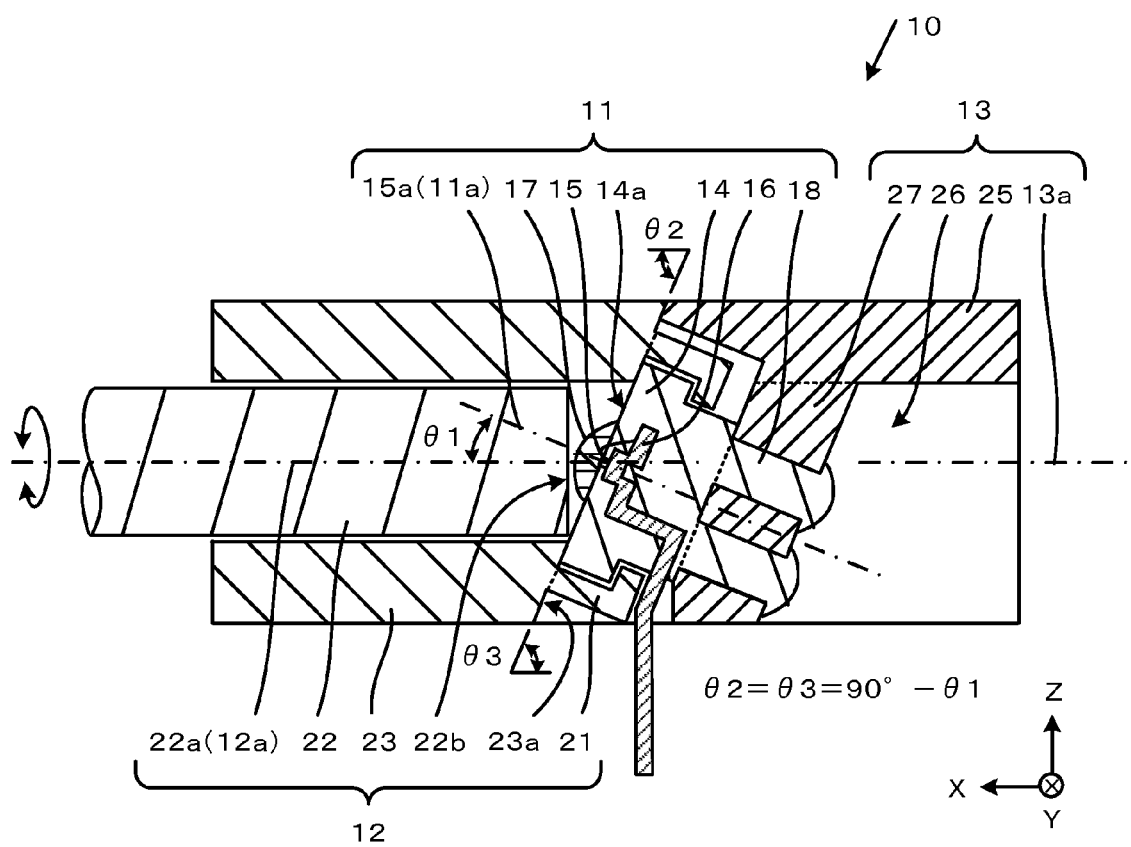
FIG. 1 is a cross-sectional view showing an optical communication module according to a first embodiment.

According to one embodiment, an optical communication module includes an optical unit and an optical connector. The optical unit includes an optical semiconductor element and a base. The optical semiconductor element has a first optical axis. The base has a first surface and a mounting portion to mount an optical connector. The first surface is perpendicular to the first optical axis. The base is provided with the optical semiconductor element. The optical connector is mounted at the mounting portion and is capable of rotating around the first optical axis. The optical connector includes a first housing and a light-guiding body. The first housing has a second surface facing the first surface and a second axis crossing the first optical axis at a first angle. The light-guiding body is provided inside the first housing and has an end plane perpendicular to the second axis.

Embodiments will be descried below with reference to the drawings. Wherever possible, the same reference numerals will be used to denote the same or like portions throughout the detailed description and the figures.

(First Embodiment)

Figure 2A:
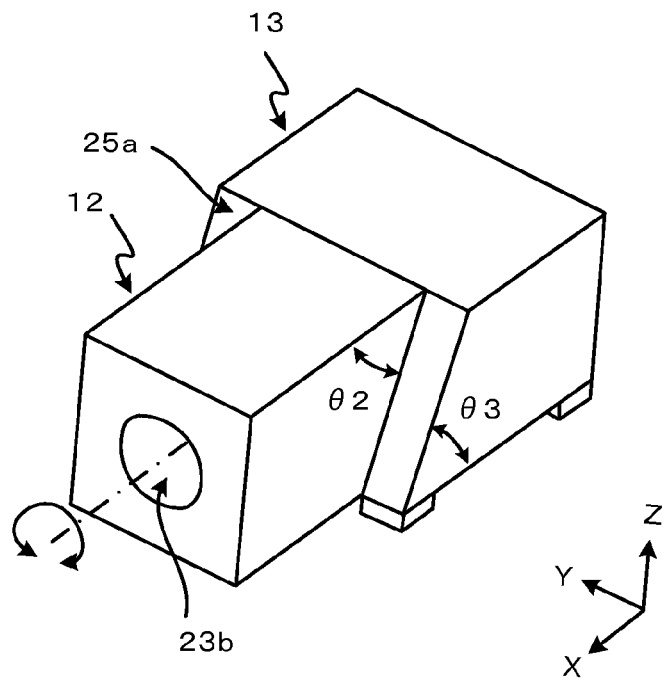
FIGS. 2A and 2B are perspective views showing the optical communication module according to the first embodiment.
Figure 2B:
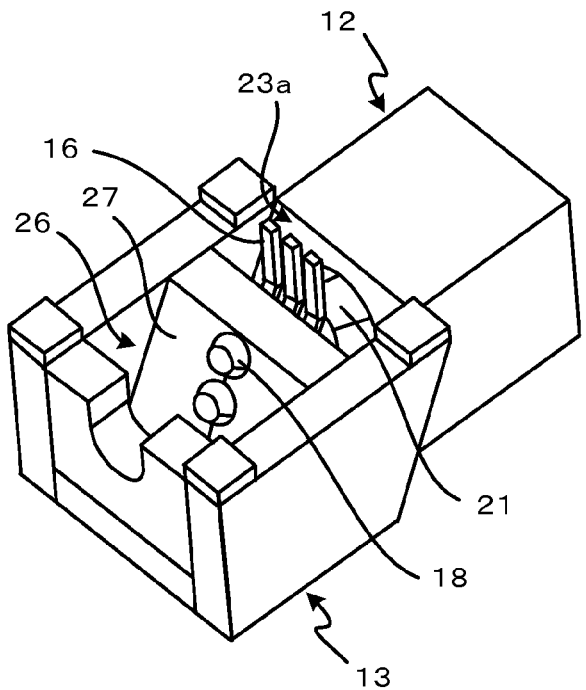
Figure 3A:
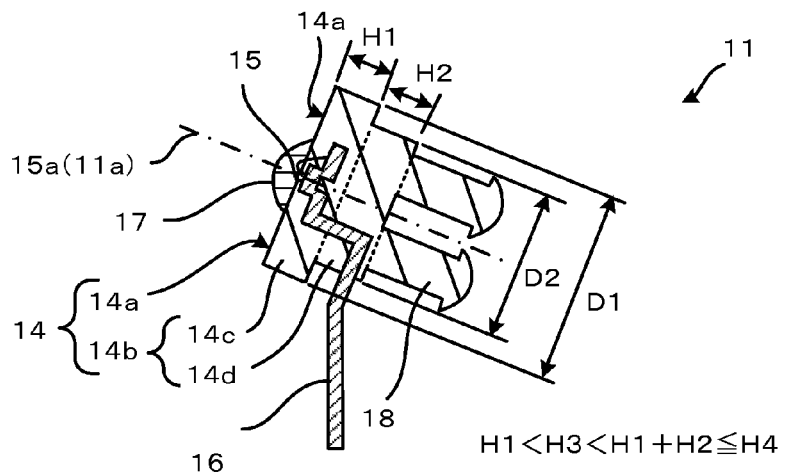
FIGS. 3A to 3C are cross-sectional views showing the optical communication module according to the first embodiment.
Figure 3B:
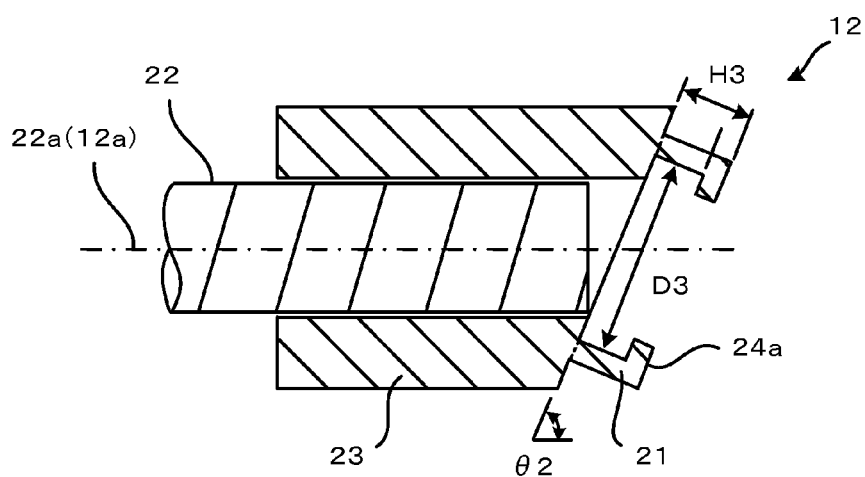
Figure 3C:
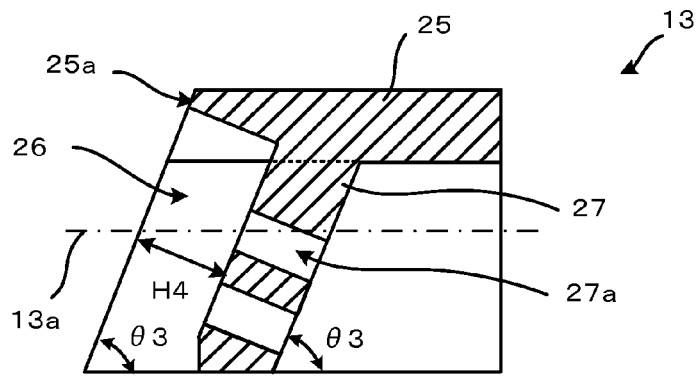
Figure 4A:
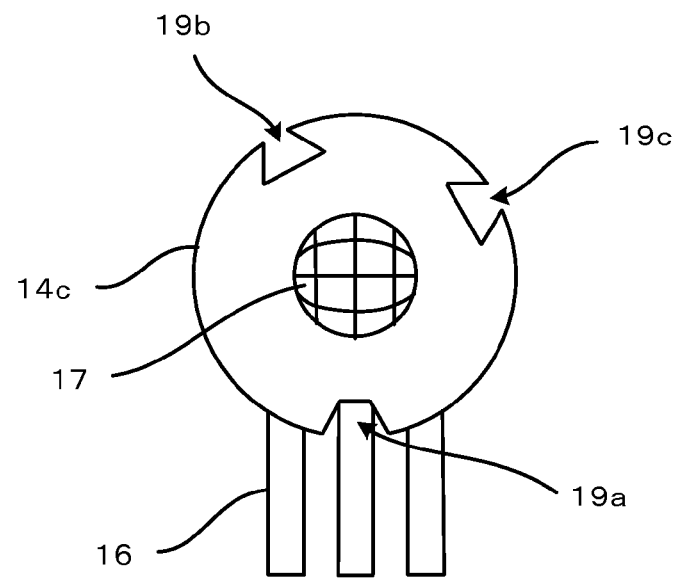
FIGS. 4A and 4B are plan views showing main portions of the optical communication module according to the first embodiment.
Figure 4B:
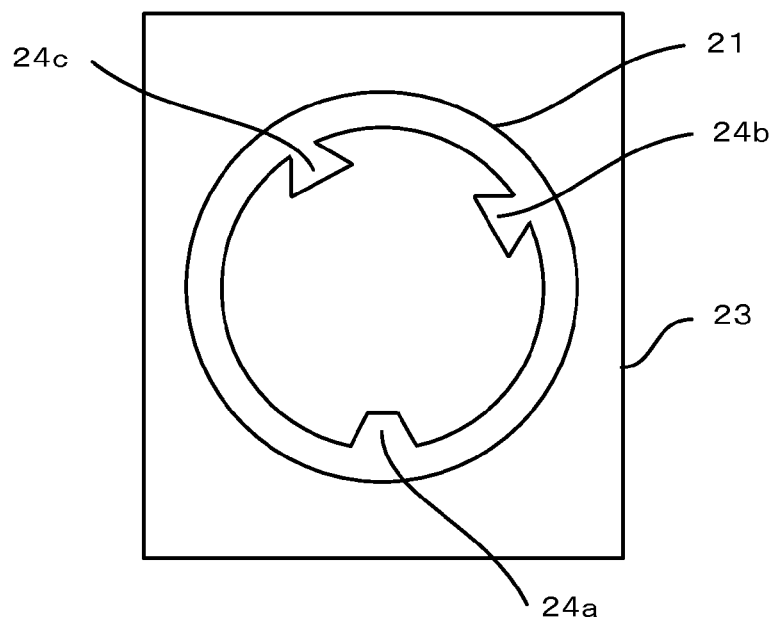

An optical communication module in accordance with a first embodiment will be described below with reference to FIGS. 1 to 4. FIG. 1 is a cross-sectional view showing the optical communication module in accordance with a first embodiment. FIGS. 2A and 2B are perspective views showing the optical communication module. FIGS. 2A and 2B are perspective views, which are viewed from above and underneath, respectively. FIGS. 3A to 3C are disassembled cross-sectional views showing the optical communication module. FIGS. 4A and 4B are plan views showing main portions of the optical communication module.

The optical communication module is capable of connecting an optical connector with an optical unit in arbitrary direction. The optical connector includes optical fibers. The optical unit includes an optical semiconductor element for radiating or detecting light.

The optical communication module will be briefly described.

As shown in FIGS. 1A, 1B, 2A, 2B, 3A, 3B, 3C, 4A and 4B, an optical communication module 10 of the embodiment includes an optical unit 11, an optical connector 12, and a body 13 holding the optical unit 11. The optical connector 12 is connected with the optical unit 11 and is capable of rotating around the optical unit 11.

An optical axis (a first optical axis) 15a of the optical unit 11 intersects with a second axis 12a of the optical connector 12 at a first angle θ1. The second axis 12a coincides with a third axis 13a of the body 13. The first angle θ1 is approximately 22.5°, for example.

Rotating the optical connector 12 leads the second axis 12a to rotate in a circular cone around the optical axis 15a. Thus, the optical connector 12 is connected with the optical unit 11 from every direction.

An angle formed by the intersection of the optical axis 15a with the second axis 12a is the first angle θ1 in all cases, thereby keeping optical coupling between the optical unit 11 and the optical connector 12. Meanwhile, an angle formed by the intersection of the second axis 12a and the third axis 13a varies from 0° to 2θ1.

The optical communication module will be described in detail below.

It is assumed that:
an X direction penetrates through the optical unit 11, the optical connector 12, and the body 13;
a Z direction is a height direction of the body 13; and
a Y direction is normal to the X and Z directions.

The optical unit 11 includes an optical semiconductor element 15 having the optical axis 15a, and a base 14. The base 14 disposes the optical semiconductor element 15 therein, and includes a first surface 14a and a mounting portion 14b to mount the optical connector 12.

The optical semiconductor element 15 is disposed at an intersection of the optical axis 15a and the second axis 12a. A distribution of light emitted from the optical semiconductor element 15 reaches a peak in a direction of the optical axis 15a.

The optical unit 11 further includes a lead frame 16, a dome shaped resin 17, and a plurality of projections 18. The lead frame 16 mounts the optical semiconductor element 15 by bonding. The dome shaped resin 17 provided on a first surface 14a covers the optical semiconductor element 15. The projections 18 are provided so as to stand on the opposite side of the first surface 14a of the base 14. The projections 18 are round bars, for example.

As shown in FIG. 3A, the mounting portion 14b includes a first pillar 14c and a second pillar 14d. The first pillar 14c has a first diameter D1 and a first height H1. The second pillar 14d is connected coaxially with the first pillar 14c, and has a second diameter D2 and a second height H2. The second diameter D2 is smaller than the first diameter D1.

As shown in FIG. 4A, grooves 19a, 19b, 19c are provided on the side of the first pillar 14c, and reach a surface on the opposite side of the first surface 14a. The grooves 19a, 19b, 19c are distributed in a circumferential direction at angular intervals of 120°, for example.

The groove 19a has a fan shape, i.e., the width of the groove 19a is larger in the outer circumference than in the inner circumference of the first pillar 14c. The grooves 19b, 19c have reverse-fan shapes, i.e., the widths of the grooves 19b, 19c are smaller in the outer circumference than in the inner circumference of the first pillar 14c.

The lead frame 16 includes die pads, bonding pads, and lead terminals. The lead terminals extend from the die pads and the bonding pads. The optical semiconductor element 15 is mounted on the die pads. The optical semiconductor element 15 is electrically connected to the bonding pads through wires.

The die pad and the bonding pad are disposed parallel to the first surface 14a within the base 14. The lead terminal bends to be parallel or perpendicular to a first axis 11a, and extends from the side of the second pillar 14d. The lead terminal further extends to be bent in the Z direction.

The base 14 and the projections 18 are made of thermosetting resin by molding, for example. The optical semiconductor element 15 is a GaAs light-emitting diode that emits near-infrared light. The lead frame 16 is made of steel sheet covered with a nickel film. The resin 17 is silicone resin transparent to near-infrared light, for example.

The resin 17 focuses light emitted from the optical semiconductor element 15. The optical unit 11 has a light distribution pattern having a maximum light intensity on the first axis 11a. The first axis 11a is coincident to the optical axis 15a.

The optical connector 12 has a first housing 23 and a light-guiding body 22. The first housing 23 has a second surface 23a facing the first surface 14a, and the second axis 12a intersecting with the optical axis 15a at the first angle θ1. The light-guiding body 22 is provided inside the first housing 23 and has an end plane 22b perpendicular to the second axis 12a. The optical connector 12 is mounted at the mounting portion 14b and is capable of rotating around the optical axis 15a.

The optical connector 12 further includes a cylindrical portion 21. The cylindrical portion 21 is engaged at the mounting portion 14b and is capable of rotating around the optical axis 15a. The first housing 23 is connected with the cylindrical portion 21. The light-guiding body 22 (optical fiber) is inserted into the first housing 23. The light-guiding body 22 is optically coupled with the optical semiconductor 15.

The first housing 23 has the second surface 23a and an opening 23b. The second surface 23a inclines at a second angle θ2 with respect to the second axis 12a. The opening 23b is coaxially aligned with the second axis 12a. The first housing 23 has a shape obtained by cutting a rectangular parallelepiped at the second angle θ2. The cut surface is the second surface 23a. The second angle θ2 is a complementary angle (90°−θ1) of the first angle θ1, for example.

The cylindrical portion 21 is provided to stand on the second surface 23a so as to surround the opening 23b. An optical fiber 22 is inserted into the housing 23 through the opening 23b. The second axis 12a is coincident to an optical axis 22a of the optical fiber 22. The optical axis 22a passes through a center of the optical fiber 22.

As shown in FIG. 3B, the cylindrical portion 21 has a third diameter (inner diameter) D3 and a third height H3. The third diameter D3 enables it to smoothly insert the optical unit 11 having the first diameter D1 into the optical connector 12 having the third diameter D3. The third height H3 is larger than the first height H1, and is smaller than the sum of the first height H1 and the second height H2 (H1<H3<H1+H2).

As shown in FIG. 4B, the cylindrical portion 21 has convex portions 24a, 24b, 24c protruding toward the center of the cylindrical portion 21. The convex portions 24a, 24b, 24c are arranged in a circumferential direction at the same angular intervals as the grooves 19a, 19b, 19c.

The convex portion 24a has a width that becomes smaller toward the center of the cylindrical portion 21. The convex portions 24b, 24c have a width that becomes larger toward the center of the cylindrical portion 21.

The convex portions 24a, 24b, 24c are inserted into the grooves 19a, 19b, 19c, respectively. The convex portions 24a, 24b, 24c and the grooves 19a, 19b, 19c have a relationship between a key groove and a key.

The convex portions 24a, 24b, 24c; and the grooves 19a, 19b, 19c are aligned with each other to enable the cylindrical portion 21 to be removed from or fitted into the mounting portion 14b.

The mounting portion 14b is inserted into the cylindrical portion 21 by passing the convex portions 24a, 24b, 24c through the grooves 19a, 19b, 19c, respectively. The cylindrical portion 21 is capable of rotating around the optical axis 15a. The convex portions 24a, 24b, 24c serve as stoppers at any positions other than the position where the convex portions 24a, 24b, 24c meet the grooves 19a, 19b, 19c, respectively. The cylindrical portion 21 will therefore never drop out of the mounting portion 14b.

The first housing 23 and the cylindrical portion 21 are made by molding from thermoset resin, for example. The optical fiber 22 is a plastic fiber, for example.

The body 13 includes a second housing 25 and a divider plate 27. The second housing 25 has a third axis 13a corresponding to the second axis 12a, a third surface 25a inclining at a third angle θ3 with respect to the third axis 13a, a concave portion 26 on the third surface 25a. The divider plate 27 is parallel to the third surface 25a in the concave portion 26.

The second housing 25 has a shape obtained by cutting a box at the third angle θ3. The cut surface of the box is the third surface 25a. The inner space of the box is the concave portion 26. The third angle θ3 equals the second angle θ2, for example.

A portion of the third surface 25a that corresponds to a top plate of the box is cut out by a depth of H4 perpendicularly to the third surface 25a. As will be described later, the space having the depth of H4 is for the cylindrical portion 21 to rotate around the mounting portion 14b when the optical unit 11 is held by the divider plate 27.

As shown in FIG. 3C, the divider plate 27 is mounted at a position recessed from the third surface 25a just by the depth of H4. The divider plate 27 has a chamfered edge parallel to the Z direction. The divider plate 27 has openings 27a in which the projections 18 are inserted. The divider plate 27 holds the optical unit 11.

The second housing 25 and the divider plate 27 are made from thermoset resin by molding, for example.

A second axis 12a of the optical connector 12 is a line that passes through a cross point of the diagonal lines of the first housing 23 in the Y-Z plane and is parallel to the X direction. A third axis 13a of the body 13 is a straight line that passes through a cross point of the diagonal lines of the second housing 25 and is parallel to the X direction.

Figure 5A:
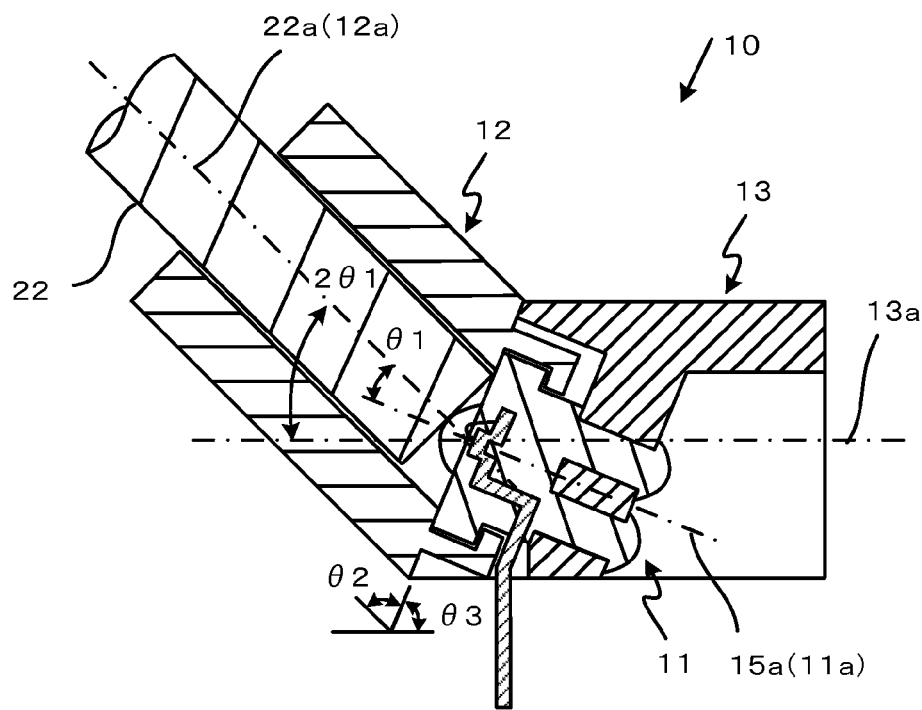
FIGS. 5A and 5B are views showing the optical communication module having another connection direction according to the first embodiment.
Figure 5B:
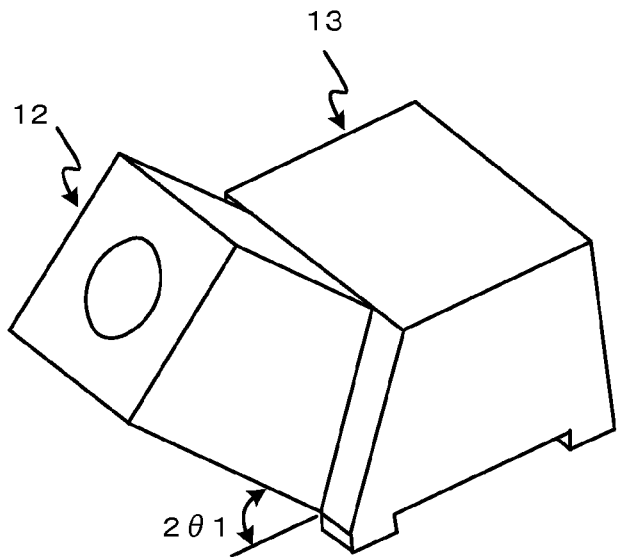

FIGS. 5A and 5B show the optical communication module 10 where the connection direction of the optical connector 12 is varied by rotating the optical connector 12. FIG. 5A is a cross-sectional view thereof. FIG. 5B is a perspective view which is viewed from above.

As shown in FIGS. 5A and 5B, the optical communication module 10 has rotated the optical connector 12 at an angle of 180°. The second axis 12a of the optical connector 12 inclines just at an angle of 2θ1 with respect to the third axis 13a of the body 13.

When the first angle θ1 is 22.5°, the optical connector 12 makes an angle of 45° with the body 13. The optical axis 15a and the second axis 12a cross each other at a first angle θ1 to bring about no change in the optical connection between the optical semiconductor 15 and the optical fiber 22.

The inclined angle of the optical connector 12 to the body 13 is a supplementary angle (180°−(θ2+θ3)) for the sum of the second angle θ2 and the third angle θ3.

A method of manufacturing the optical communication module 10 will be described below. FIGS. 6A, 6B, 7A, 7B, 7C, 8A, and 8B are perspective views sequentially showing manufacturing steps of the optical communication module 10.

Figure 6A:
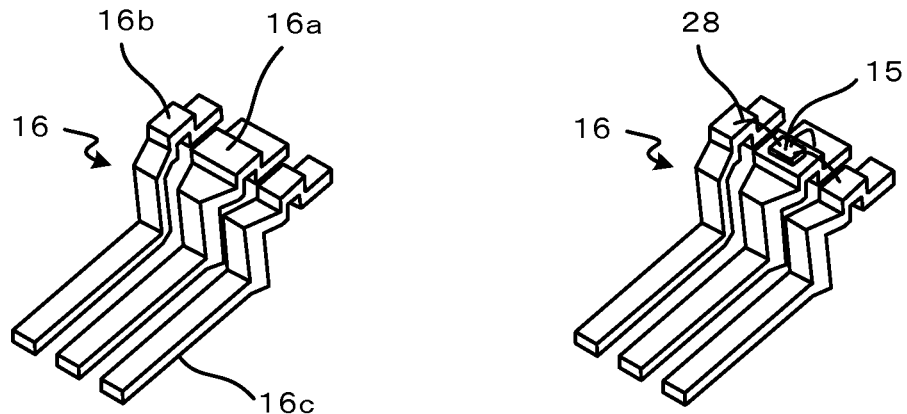
FIGS. 6A, 6B, 7A, 7B, 7C, 8A and 8B are perspective views sequentially showing manufacturing steps of the optical communication module according to the first embodiment.

As shown in FIG. 6A, a lead frame 16 is provided; and lead terminals 16c which are extending from a die pad 16a and a bonding pad 16b are cranked. The optical semiconductor element 15 is fixed to the die pad 16a with bonding adhesive. Electrodes (not shown) of the optical semiconductor element 15 are connected to bonding pads 16b using wire 28.

Figure 6B:
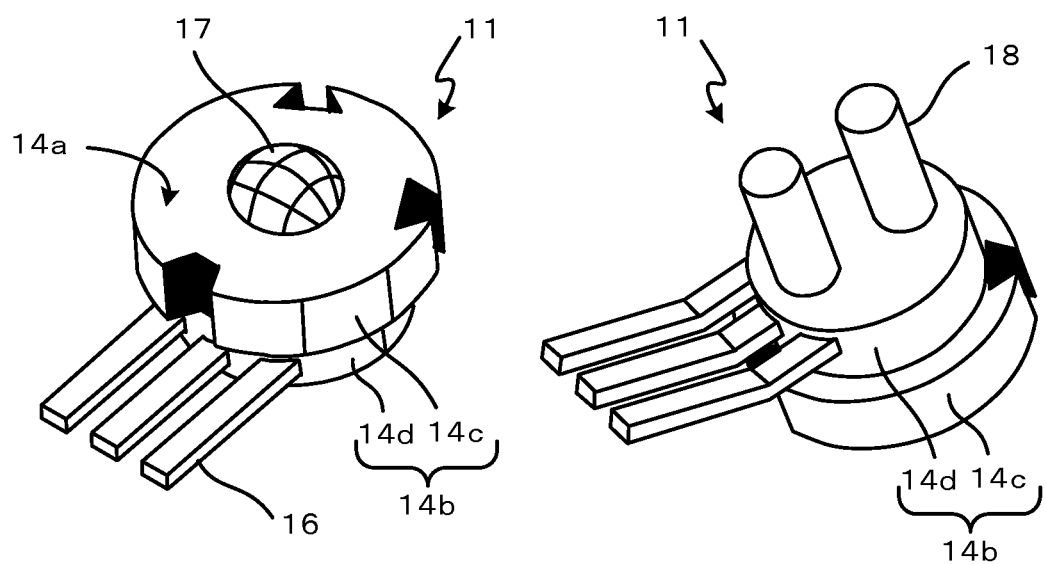

As shown in FIG. 6B, the base 14 and the projections 18 are integrally molded with opaque epoxy resin using a mold, for example. The base 14 covers both the optical semiconductor element 15 and the lead frame 16. The upper surface of the optical semiconductor element 15 is exposed on the first surface 14a of the first pillar 14c.

The resin 17 is formed on the first surface 14a including the upper surface of the optical semiconductor element 15 by potting, for example. After the optical unit 11 is mounted to the body 13, the lead terminals 16c exposed from the side of the second pillar 14d are bent so as to be parallel to the Z axis, thereby forming the optical unit 11 shown in FIG. 1.

The present embodiment exemplifies the forming of the base 14 and the projections 18 by the use of opaque epoxy resin. Alternatively, the resin 17, the base 14, and the projections 18 may be integrally molded with transparent resin.

Figure 7A:
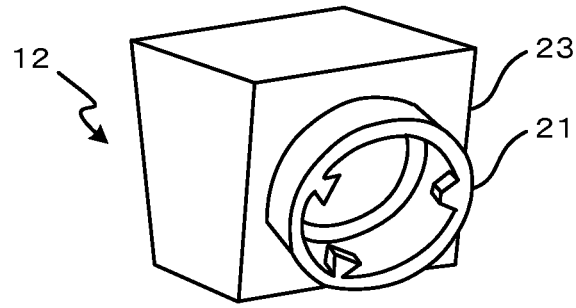

As shown FIG. 7A, both the cylindrical portion 21 and the first housing 23 are integrally molded with opaque epoxy resin to obtain the optical connector 12. At this step, however, the optical fiber 22 has not been inserted into the opening 23b of the first housing 23.

Figure 7B:
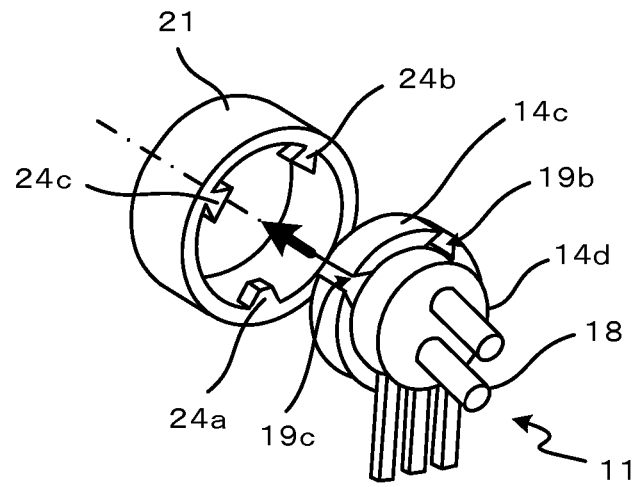

As shown in FIG. 7B, the convex portions 24a, 24b, 24c of the cylindrical portion 24 are aligned with the grooves 19a, 19b, 19c of the first pillar 14c to insert the optical unit 11 into the cylindrical portion 21.

Figure 7C:
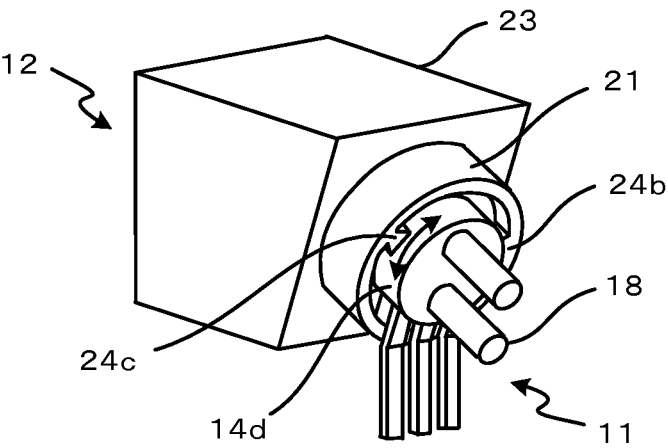

As shown in FIG. 7C, the convex portions 24a, 24b, 24c are located at the rear of the first pillar 14c; and are separated from the second pillar 14d. This enables the cylindrical portion 21 to be engaged on the mounting portion 14b of the optical unit 11 and be capable of rotating around the optical axis 15a.

Figure 8A:
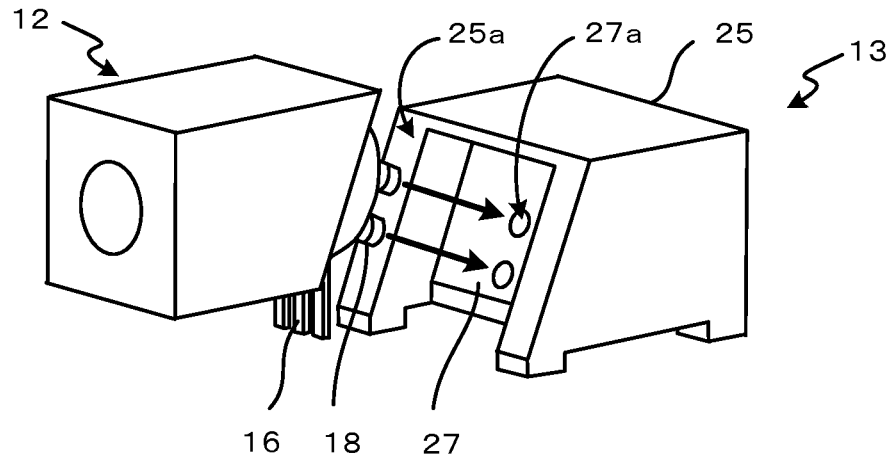

As shown in FIG. 8A, the second housing 25 and the divider plate 27 are integrally molded with opaque epoxy resin to obtain the body 13.

Figure 8B:
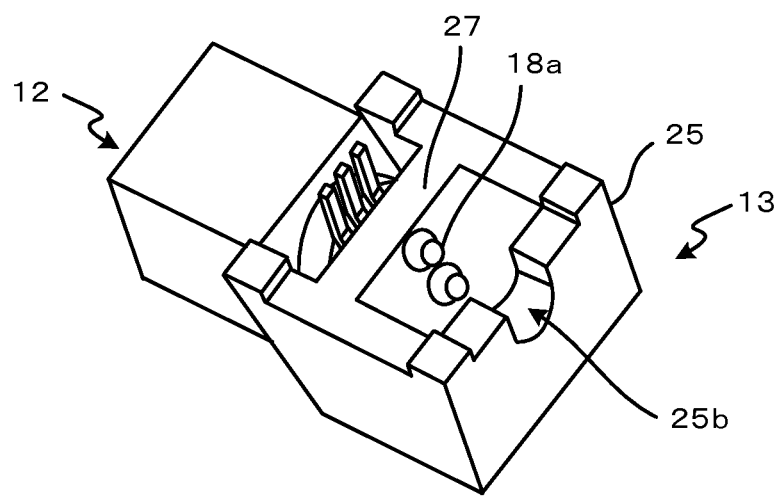

As shown in FIG. 8B, a projecting portion 18a of the projection 18 projects toward the rear side of the divider plate 27. The optical unit 11 is fixed to the divider plate 27 by thermally swaging the projecting portion 18a. In the thermal swaging, a resin pin or a resin boss is heated and deformed to connect two parts. The thermal swaging eliminates the needs for screws.

The projecting portion 18a, which projects toward the rear side of the divider plate 27, is heated with a heater such as a soldering iron through a U-shaped slit 25b at the rear side of the second housing 25, for example. The heating thermally deforms the projecting portion 18a to fix the optical unit 11 to the body 13.

As described above, the optical communication module 10 of the embodiment has the optical unit 11, the optical connector 12 connected with the optical unit 11, and the body 13 holding the optical unit 11. The optical connector 12 is capable of rotating around the optical axis 15a.

The optical axis 15a and the second axis 12a of the optical connector 12 cross each other at the first angle θ1. The optical unit 11 is held at a tilt at the second angle θ2 with respect to the third axis 13a of the body 13.

As a result, the rotating of the optical connector 12 rotates the second axis 12a such that the second axis 12a draws a circular cone, thereby enabling the connection direction of the optical connector 12 to be varied.

The above descriptions exemplify the cases where the first angle θ1 is 22.5°, the second angle θ2 and the third angle θ3 are complementary angles of the first angle θ1, and the inclined angle of the optical connector 12 to the body 13 ranges from 0° to 45°. Alternatively, the first angle θ1, the second angle θ2, and the third angle θ3 may be varied respectively so that the inclined angle is set to another range.

When the second angle θ2 and the third angle θ3 are δθ smaller than the first angle θ1, the inclined angle of the optical connector 12 to the body 13 becomes from 2δθ to 45°+2δθ.

The above descriptions exemplify a case where the optical semiconductor element 15 is a light-emitting diode. Alternatively, the optical semiconductor element 15 may be a photodiode, a phototransistor, and the like.

The above descriptions exemplify a case where the first pillar 14c includes the three grooves 19a, 19b, 19c; and the cylinder 21 includes the three convex portions 24a, 24b, 24c. Alternatively, at least one groove and at least one convex portion are capable of preventing the cylinder 21 from dropping out of the first pillar 14c. A plurality of the grooves and the convex portions enables the cylinder 21 to smoothly rotate.

The above descriptions exemplify a case where the first housing 23 is a rectangular parallelepiped. Alternatively, the first housing 23 may be cylindrical in shape. When the first housing 23 is cylindrical, a notch may be provided on the side of the cylinder only as a guide for the alignment of the grooves 19a, 19b, 19c; and the convex portions 24a, 24b, 24c.

The above descriptions exemplify a case where the second housing 25 is boxy in shape. Alternatively, the second housing 25 may be a rectangular parallelepiped. When the second housing 25 is a rectangular parallelepiped, an adhesive agent is applied to the projections 18 and the projections 18 with the adhesive agent applied thereto is inserted into the opening 27a, thereby fixing the optical unit 11 to the body 13.

The above descriptions exemplify a case where the second angle θ2 equals the third angle θ3. Alternatively, the effect of the embodiment may be obtained even if the second angle θ2 does not equal the third angle θ3. If the second angle θ2 does not equal the third angle θ3, the second surface 23a does not contact the third surface 25a. As a result, the rotational movement of the optical connector 12 may be limited. It is therefore desirable that the second angle θ2 equals the third angle θ3.

The above descriptions exemplify a case where the mounting portion 14b is a pillar. Alternatively, the mounting portion 14b may have other shapes including rotating bodies, such as a circular truncated cone, a semi-spheroid, a hemisphere, a rotated parabola, a rotated hyperbola, and a combination of these. The cylindrical portion 21 is provided with a shape fitted to the shape of the mounting portion 14b. A rounded edge of the mounting portion 14b makes it easy to fix the optical connector 12.

(Second Embodiment)

Figure 9A:
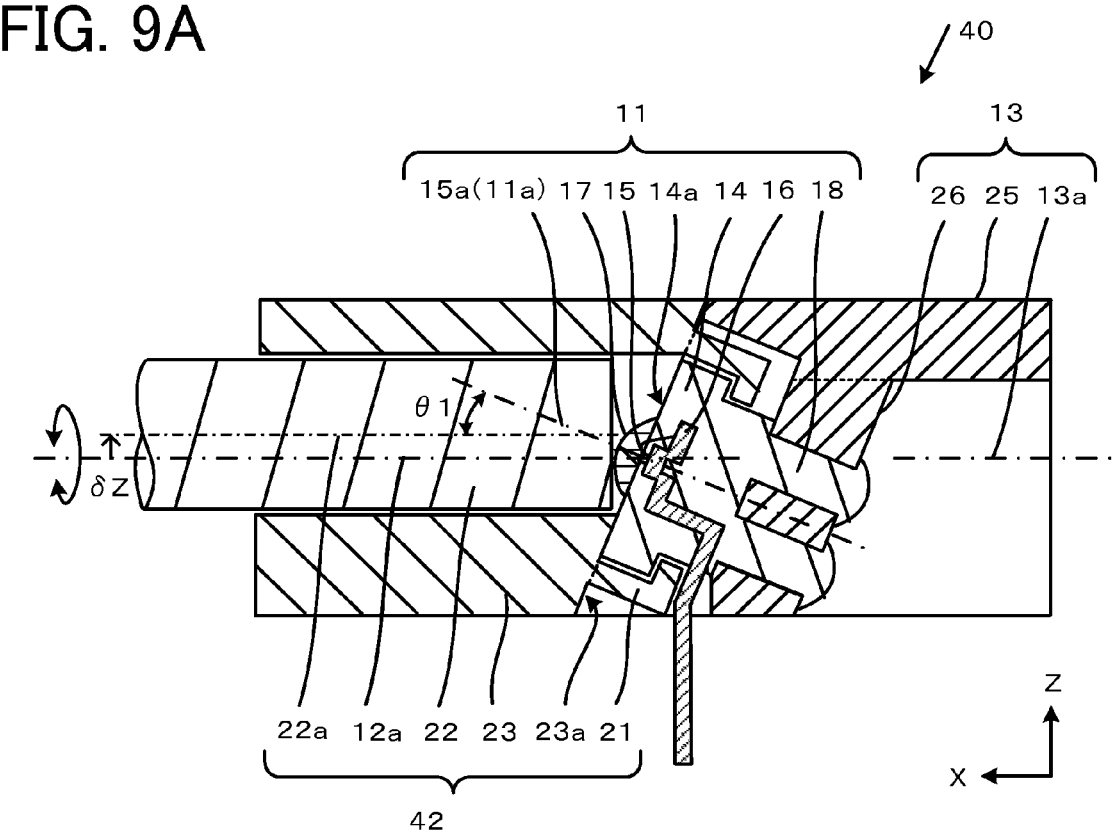
FIGS. 9A and 9B are views showing an optical communication module according to a second embodiment.
Figure 9B:
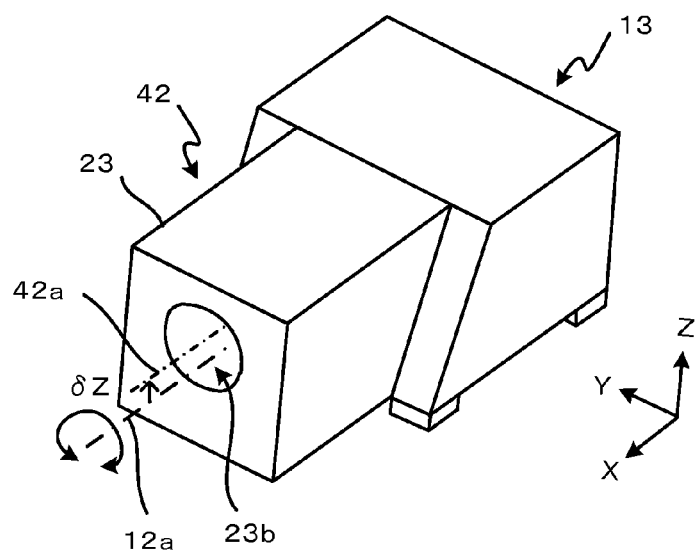

An optical communication module of a second embodiment will be described with reference to FIGS. 9A and 9B. FIG. 9A is a cross-sectional view of the optical communication module. FIG. 9B is a perspective view of the optical communication module viewed from an obliquely upward direction.

The same reference numerals as those used in the first embodiment will be used to denote the same or like portions throughout the detailed description and the figures in the second embodiment, thus being omitted. The second embodiment is different from the first embodiment in that the optical axis of the optical semiconductor element and the optical axis of the optical fiber cross each other in the inside from the end plane of the optical fiber.

As shown in FIGS. 9A and 9B, the first housing 23 is included in an optical communication module 40 of the second embodiment and has the opening 23b that is shifted by δZ in the Z direction with respect to the second axis 12a. The optical fiber 22 is inserted into the opening 23b. The optical axis 22a of the optical fiber 22 is parallel to the second axis 12a.

The optical axis 15a and the optical axis 22a of the optical fiber 22 cross each other in the inside from the end plane 22b of the optical fiber 22. When the optical semiconductor element 15 is a light-emitting element, the optical semiconductor element 15 enables it to enter more light into the center of the optical fiber 22.

Figure 10A:
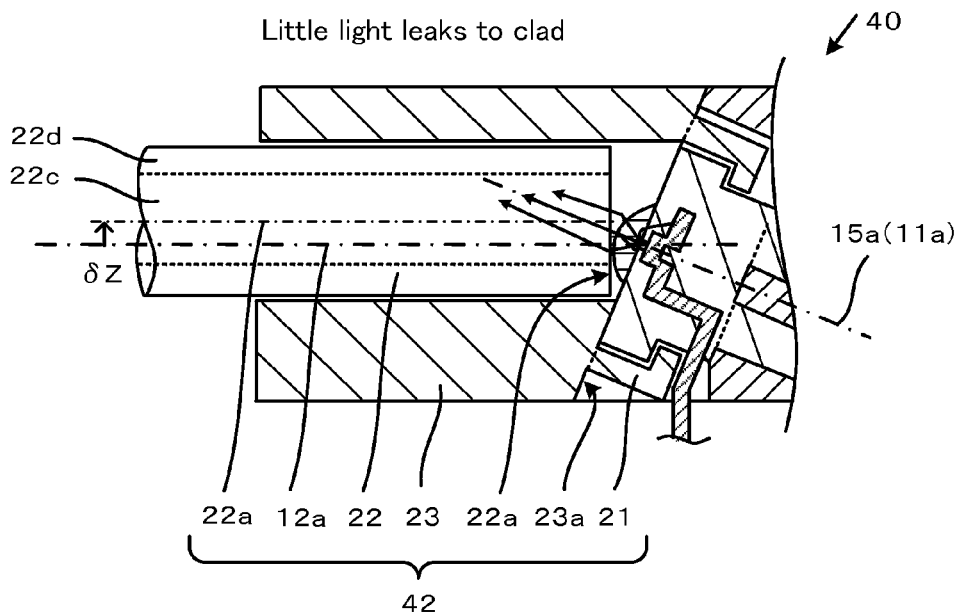
FIGS. 10A and 10B are cross-sectional views showing optical coupling of the optical communication module according to the second embodiment.
Figure 10B:
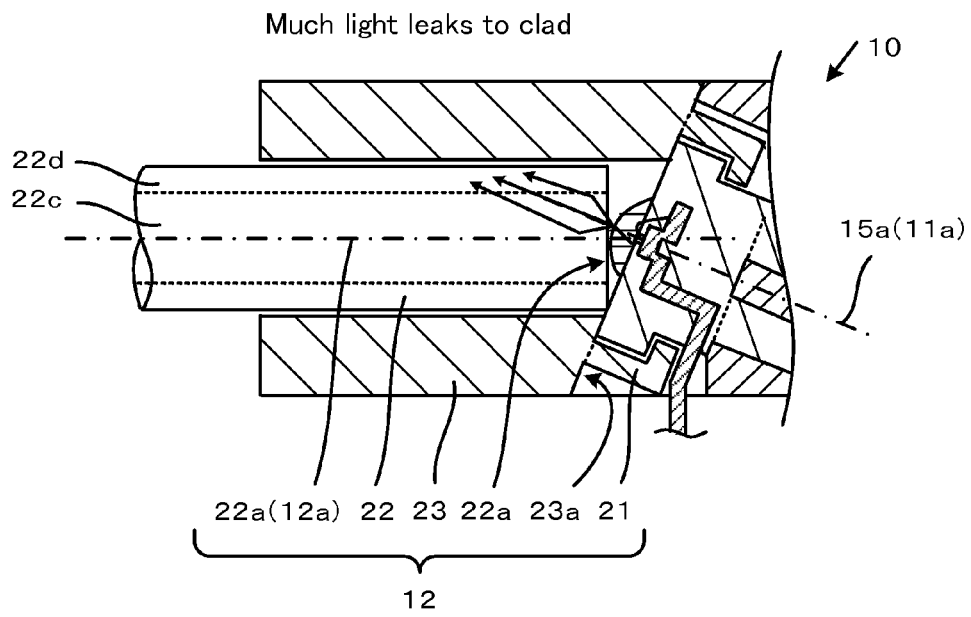

FIGS. 10A and 10B are illustrations showing an optical coupling condition of the optical communication module 40 of the second embodiment in comparison with an optical coupling condition of the optical communication module 10 of the first embodiment. FIG. 10A is a cross-sectional view showing the optical coupling condition of the optical communication module 40. FIG. 10B is a cross-sectional view showing the optical coupling condition of the optical communication module 10. At first, the optical communication module 10 will be described.

As shown in FIG. 10B, the second axis 12a of the optical connector 12 and the optical axis 22a of the optical fiber 22 coincide with each other. The optical semiconductor element 15 is disposed on the optical axis 22a of the optical fiber 22a. Hence, the optical axis 15a in the optical unit 11 and the optical axis 22a of the optical fiber 22 cross each other outside the end plane 22b of the optical fiber 22.

Since the optical semiconductor element 15 inclines with respect to the optical axis 22a of the optical fiber 22, light passing through the resin 17 enters a location out of the center of the core 22c of the optical fiber 22. As a result, the condition of total reflection is not met between the core 22c and the clad 22d to leak more light into the clad 22d, thereby decreasing an optical coupling efficiency.

Meanwhile, as shown in FIG. 10A, the optical axis 15a of the optical unit 11 and the optical axis 22a of the optical fiber 22 cross each other in the inside away from the end plane 22b of the optical fiber 22 in the optical communication module 40. The crossing of the optical axis 15a and the optical axis 22a enables more light having passed through the resin 17 to enter the center of the core 22c of the optical fiber 22. As a result, light is prevented from leaking into the clad 22d, thereby increasing the optical coupling efficiency.

Changing the offset δZ in accordance with the first angle θ1 enables it to control the quantity of light that enters the optical fiber 22.

Figure 11:
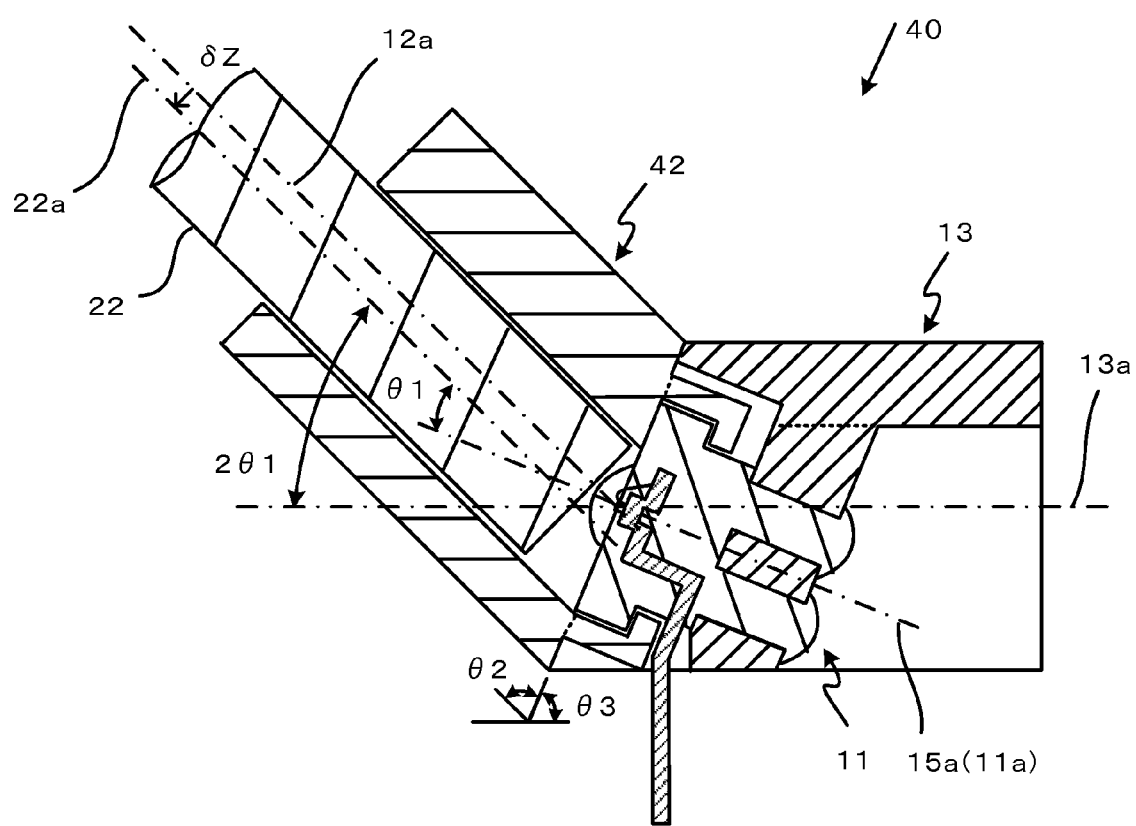
FIG. 11 is a cross-sectional view showing the optical communication module having another connection direction according to the second embodiment.

FIG. 11 is a cross-sectional view showing the optical communication module 40 where the connection direction of the optical connector 42 is varied by rotating the optical connector 42. As shown in FIG. 11, the optical communication module 40 is in a condition where the optical connector 42 has been rotated by 180°. Even rotating the optical connector 12 does not change the requirement that the optical axis 15a of the optical unit 11 and the optical axis 22a of the optical fiber 22 cross each other in the inside away from the end plane 22b of the optical fiber 22 in the optical communication module 40.

As described above, the optical axis 15a of the optical unit 11 and the optical axis 22a of the optical fiber 22 cross each other in the inside away from the end plane 22b of the optical fiber 22 in the optical communication module 40 of the present embodiment. The crossing of the optical axis 15a and the optical axis 22a enables more light having passed through the resin 17 to enter the center of the core 22c of the optical fiber 22. As a result, light is prevented from leaking into the clad 22d, thereby increasing the optical coupling efficiency.

(Third Embodiment)

Figure 12:
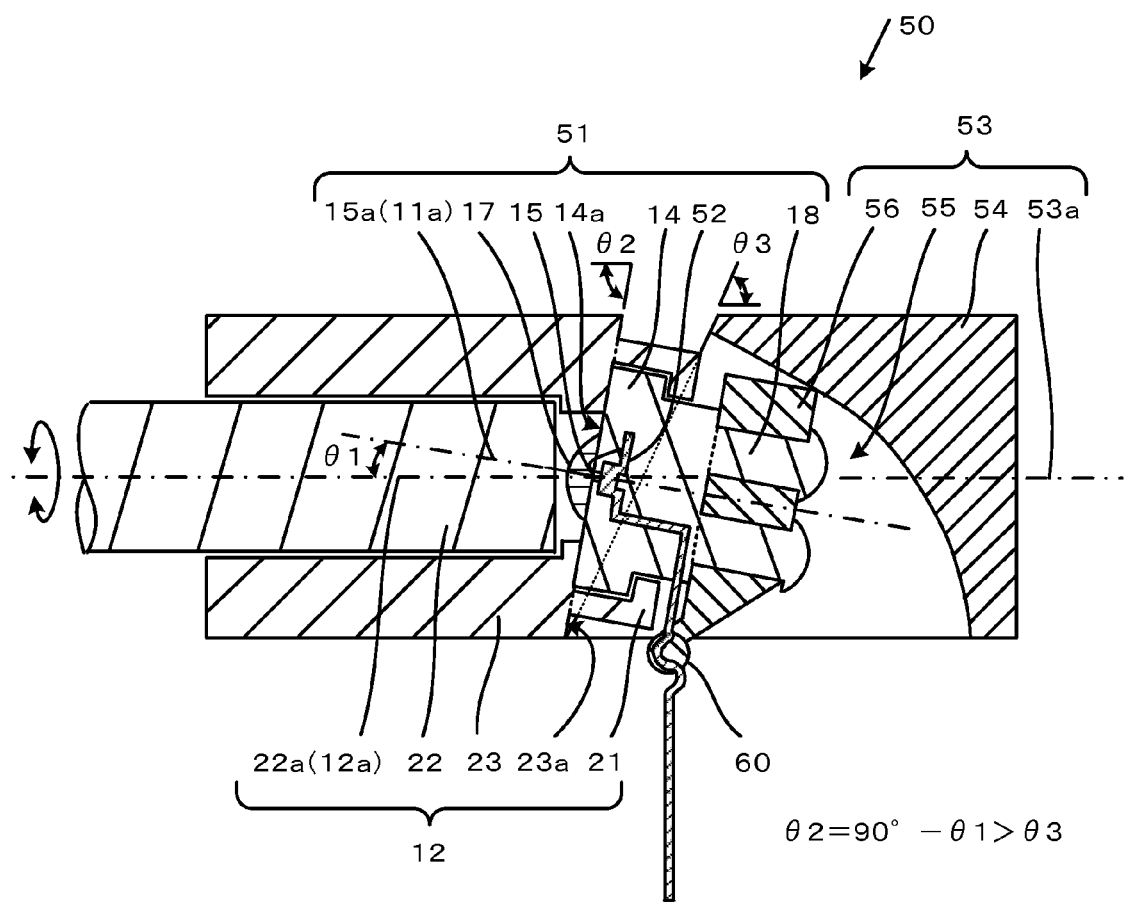
FIG. 12 is a cross-sectional view showing an optical communication module according to a third embodiment.
Figure 13A:
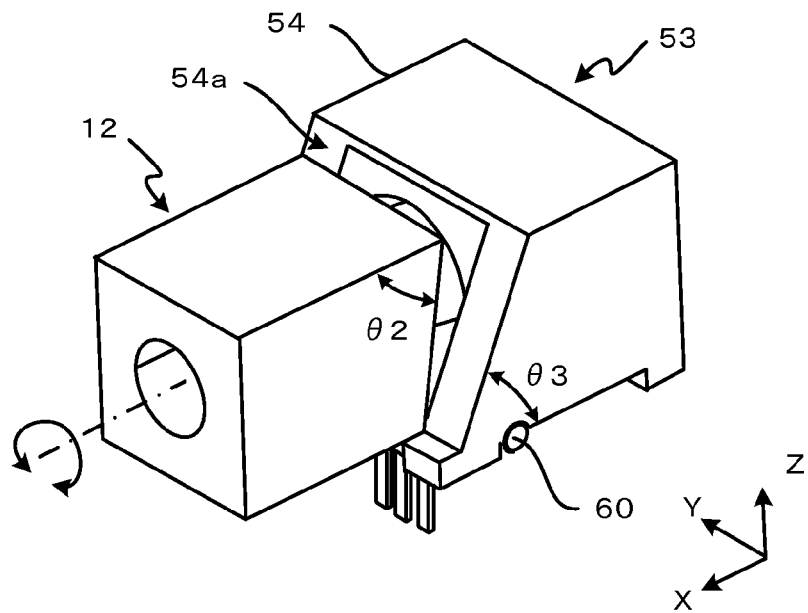
FIGS. 13A and 13B are perspective views showing the optical communication module according to the third embodiment.
Figure 13B:
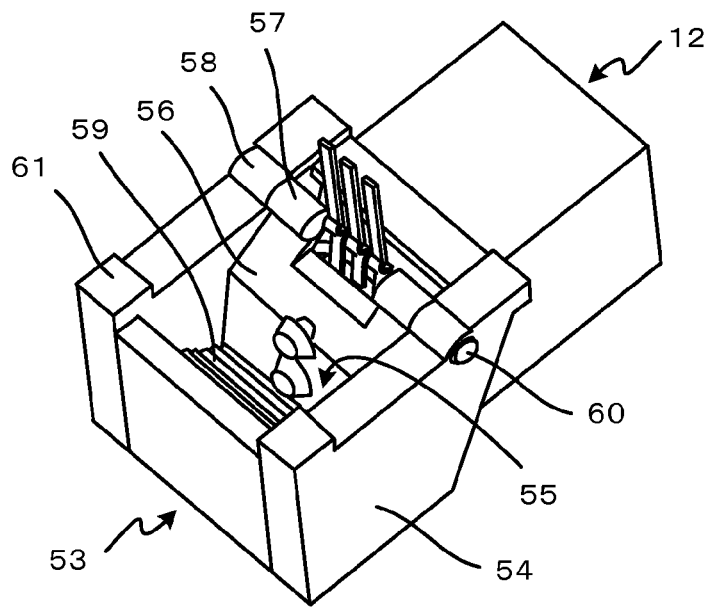

An optical communication module of a third embodiment will be described with reference to FIGS. 12, 13A, 13B, 14A and 14B. FIG. 12 is a cross-sectional view showing the optical communication module of the present embodiment. FIGS.

Figure 14A:
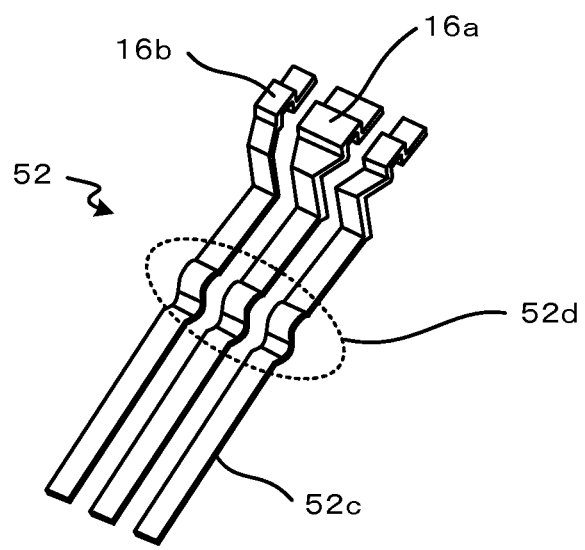
FIGS. 14A and 14B are schematic views showing main portions of the optical communication module according to the third embodiment.
Figure 14B:
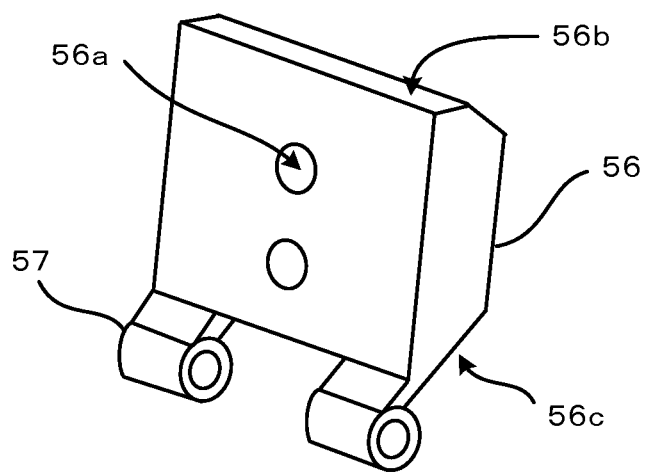

13A and 13B are perspective views, which are viewed from above and underneath, respectively. FIGS. 14A and 14B are perspective views showing main portions.

The same reference numerals as those used in the first embodiment will be used to denote the same or like portions throughout the detailed description and figures of the third embodiment, thus being omitted. The third embodiment is different from the first embodiment in that a mounting angle of the optical unit to the body is variable.

As shown in FIGS. 12, 13A, 13B, 14A and 14B, an optical unit has a lead frame 52 which has lead terminals 52c whose intermediate portions 52d are sigmoidally curved.

The intermediate portions 52d of the lead terminals 52c serve as springs. Elastic metal plates such as phosphor-bronze plates, for example are suitable for the lead frame 52. Hereinafter, the intermediate portions 52d will be referred to as spring portions 52d.

The body 53 includes a second housing 54 and a movable plate 56. The second housing 54 has a third axis 53a, a third surface 54a and a concave portion 55. The third surface 54a is inclined to the third axis 53a at a third angle θ3. The concave portion 55 has an arc shaped cross section on the third surface 54a. The movable plate 56 is disposed in the concave portion 55. The angle between the movable plate 56 and the third surface 54a is variable.

The movable plate 56 has openings 56a into which the projections 18 of the optical unit 51 are to be inserted. The upper surface 56b of the movable plate 56 is chamfered. The lower surface 56c of the movable plate 56 is inclined. A hinge 57 extends from the lower surface 56c of the movable plate 56.

The second housing 54 has a hinge 58 at the surface of the second housing 54. The hinge 58 is configured to be coaxially aligned with the hinge 57. The second housing 54 has convex ridges 59 which are aligned in the Y direction on the inside surface of the concave portion 55.

A pin 60 connects the hinge 58 coaxially with the hinge 57, thereby holding the movable plate 56 at the second housing 54. The movable plate 56 is capable of rotating around the pin 60.

The optical unit 51 is held at the movable plate 56. The lead terminals 52c are fixed to a circuit board on which the optical communication module 50 is mounted. The movable plate 56 rotates around the pin 60 inside the concave portion 55. The spring portions 52d act so as to return the movable plate 56 to the original position of the movable plate 56.

The chamfered edge portion of the upper surface 56b of the movable plate 56 gears the convex ridges 59. The convex ridges 59 prevent the movable plate 56 from rotating in one stroke inside the concave portion 55. The movable plate 56 rotates little by little. The restoring force of the spring portions 52d balances the gearing force of the convex ridges 59 so that the movable plate 56 is held at a desired position.

The first angle θ1 is 10°, for example. The second angle θ2 is a complementary angle of the first angle θ1, for example. The third angle θ3 is smaller than the second angle θ2, for example.

Figure 15:
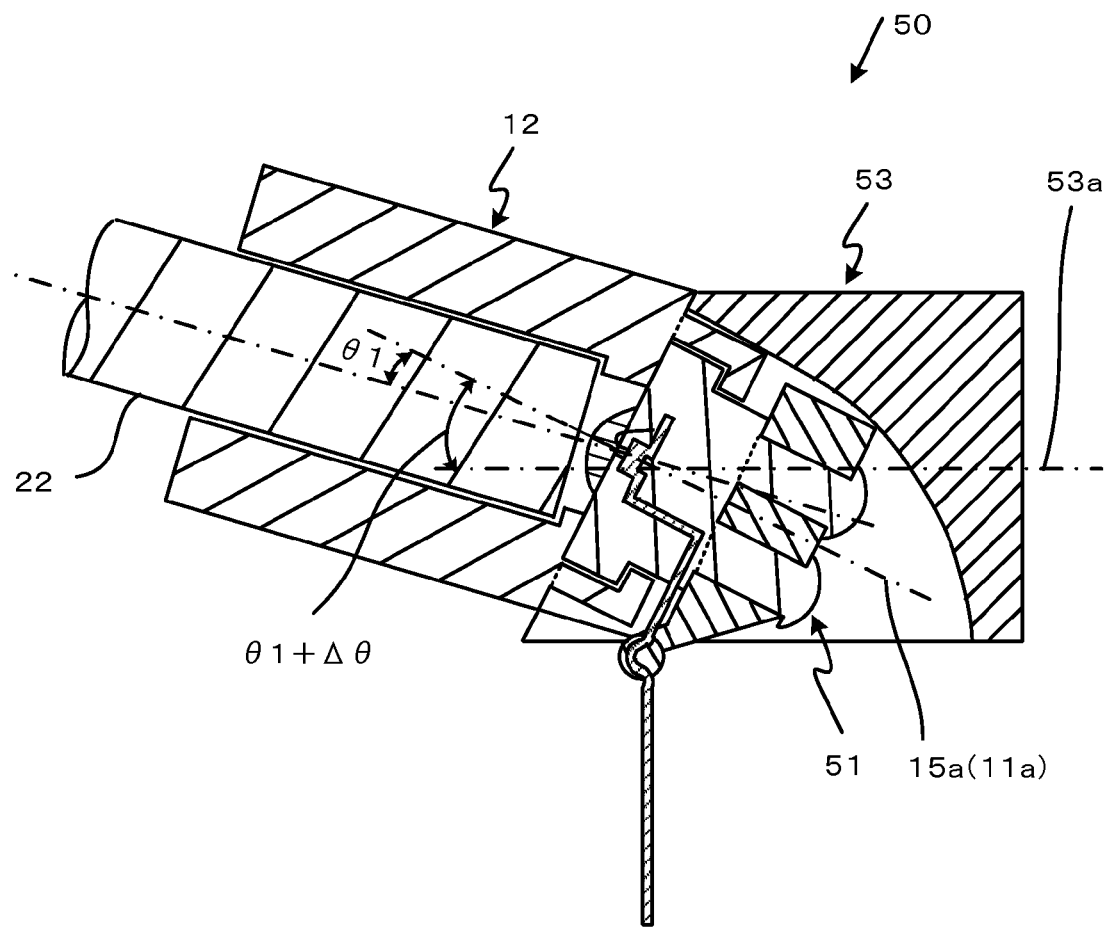
FIG. 15 is a cross-sectional view showing the optical communication module having another connection direction according to the third embodiment.

FIG. 15 is a cross-sectional view showing the optical communication module 50 where the connection direction of the body 53 and the optical connector 12 is varied by rotating the movable portion 56. As shown in FIG. 15, the movable portion 56 can rotate just by Δθ until the second surface 23a is in contact with the third surface 54a. The angle between the second axis 12a and the third axis 53a becomes θ1+Δθ. Δθ is expressed as a difference between the second angle θ2 and the third angle θ3. The difference is 15°, for example. The optical connector 12 is connected with the body 53 to incline at an angle of 15° with respect to the body 53, for example.

Figure 16:
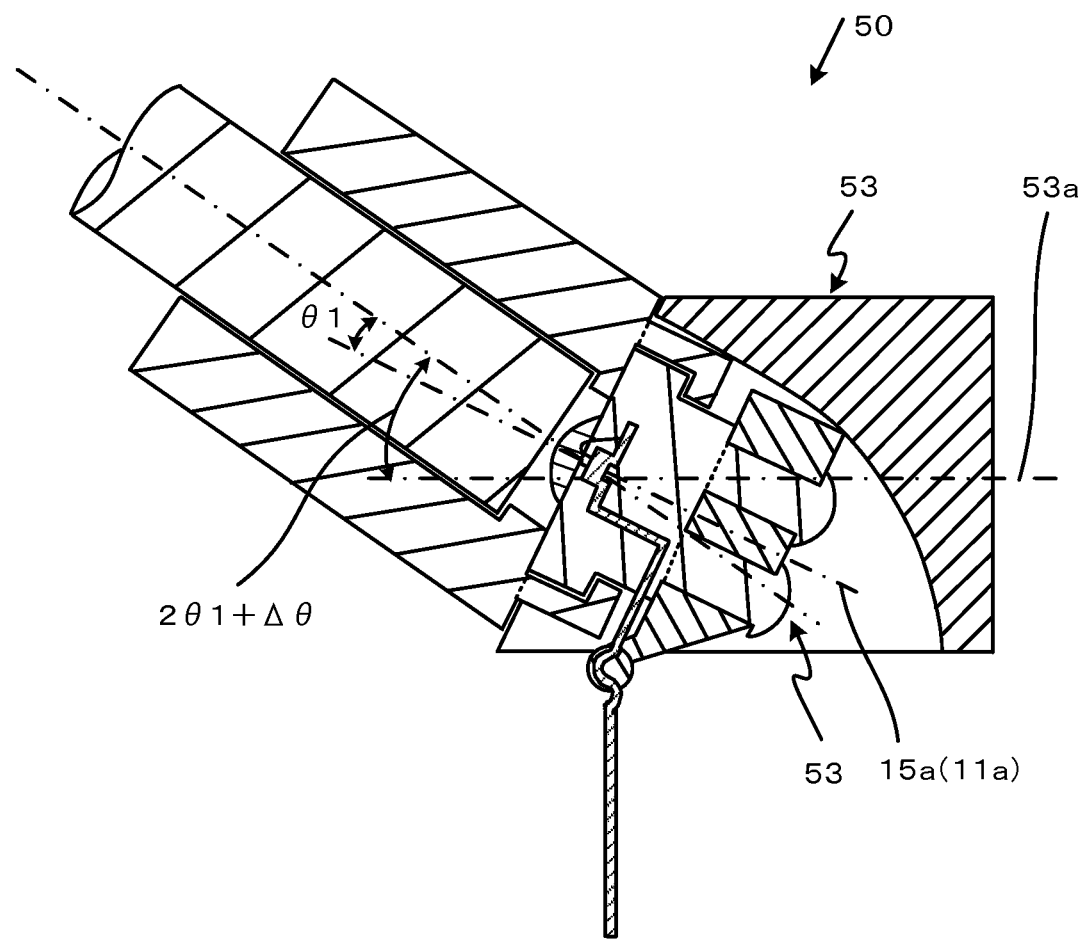
FIG. 16 is a cross-sectional view showing the optical communication module having another connection according to the third embodiment.

FIG. 16 is a cross-sectional view showing the optical communication module 50 where the connection direction of the body 53 and the optical connector 12 is varied by further rotating the optical connector 12. As shown in FIG. 16, the optical connector 12 has been rotated by an angle of 180°. The angle between the second axis 12a and the third axis 53a becomes 2θ1+Δθ. The optical connector 12 is connected with the body 53 to incline at an angle of 35° with respect to the body 53.

Rotating the movable plate 56 and the optical connector 12 enables the connection direction of the optical connector 12 to vary from 0° to 2θ1+Δθ in the optical communication module 50.

Compared with the optical communication module 10 of the first embodiment, the optical communication module 50 has advantage that the variable range of the connection direction becomes larger just by Δθ. The same connection direction enables the first angle θ1 to be small, thereby reducing optical losses caused by the inclination of the optical unit 12 to the optical fiber 22.

A method of manufacturing the optical communication module 50 will be described below. FIGS. 17A, 17B, 18A and 18B are perspective views showing main steps of the method sequentially.

Figure 17A:
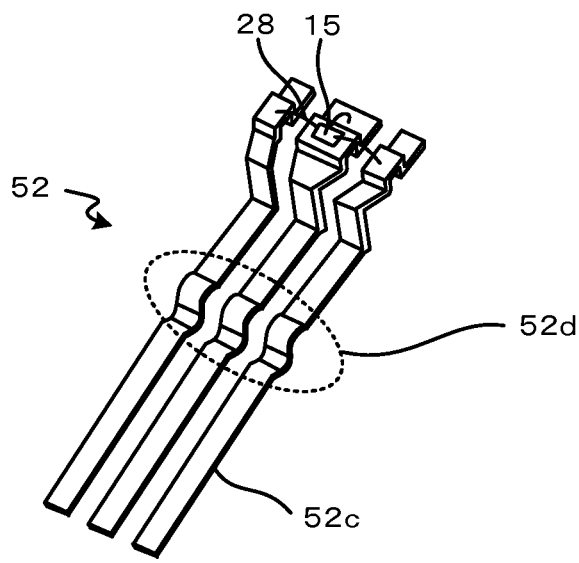
FIGS. 17A, 17B, 18A and 18B are perspective views sequentially showing manufacturing steps of the optical communication module according to the third embodiment.

As shown in FIG. 17A, a lead frame 52 is provided in the same way as shown in FIG. 6A. An optical semiconductor element 15 is mounted to the lead frame 52 to be bonded thereto.

Figure 17B:
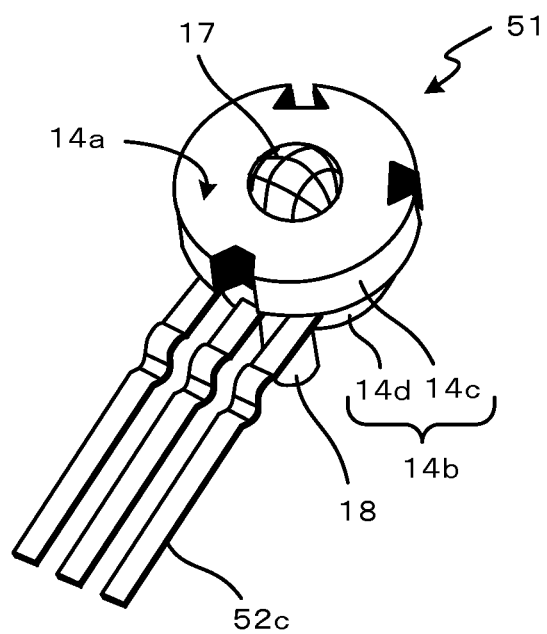

As shown in FIG. 17B, the optical unit 51 is formed in the same way as shown in FIG. 6B.

Figure 18A:
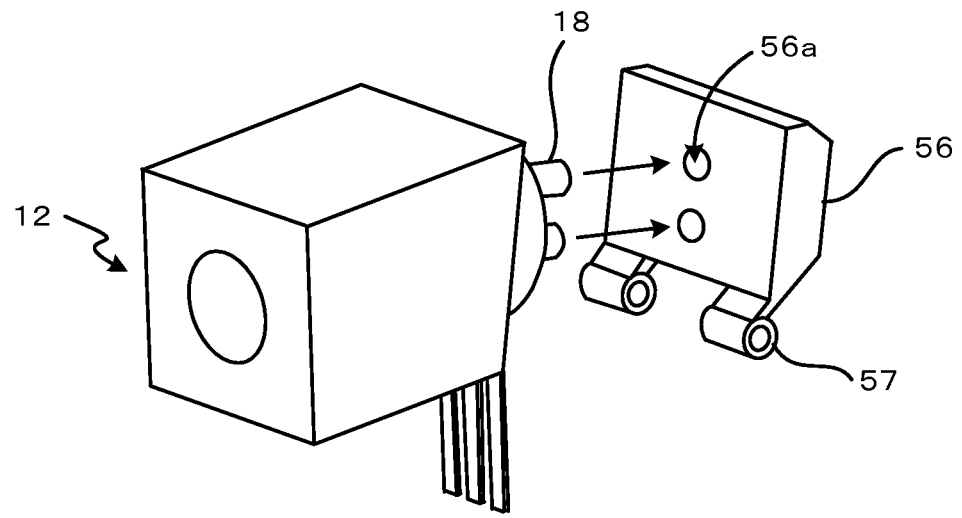
Figure 18B:
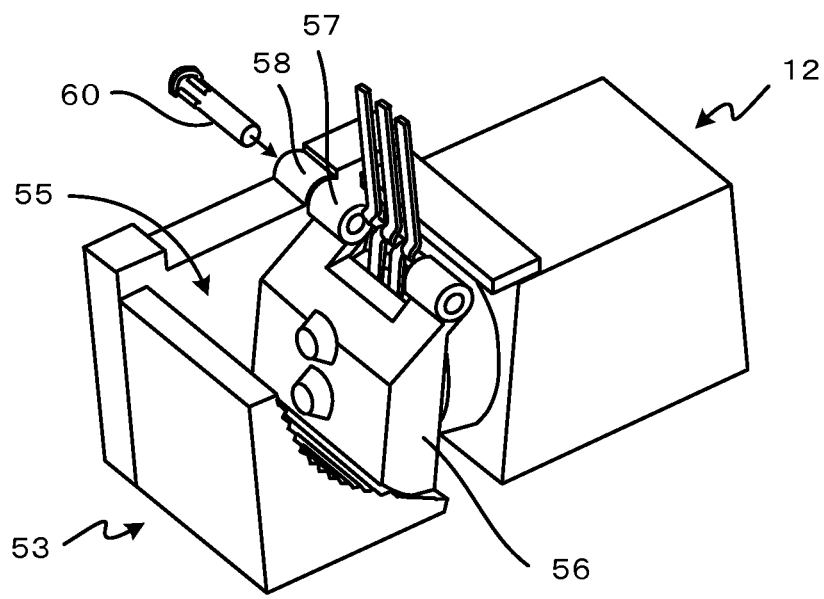

As shown in FIG. 18A, the optical unit 51 is smoothly inserted into the optical connector 12 in the same way as shown in FIG. 7B. Thereafter, the optical unit 51 is mounted to the movable plate 56.

As shown in FIG. 18A, the movable plate 56 is housed in the concave portion 55. Thereafter, the pin 60 is inserted into the hinges 57 and 58 such that the pin 60 passes through the hinges 57 and 58. The movable plate 56 is held to be rotatable. Thus, the optical communication module 50 is obtained.

As described above, the optical communication module 50 includes the optical connector 12 and the optical unit 51, each being separately rotatable. As a result, making the first angle θ1 small enables it to reduce the optical loss caused by the inclination of the optical unit 12 to the optical fiber 22.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An optical communication module, comprising:
   an optical unit including an optical semiconductor element and a base, the optical semiconductor element having a first optical axis, the base having a first surface and a mounting portion, the first surface being perpendicular to the first optical axis, the base being provided with the optical semiconductor element; and
   an optical connector mounted at the mounting portion and being capable of rotating around the first optical axis, the optical connector including a first housing and a light-guiding body, the first housing having a second surface facing the first surface and a second axis crossing the first optical axis at a first angle, the light-guiding body being provided inside the first housing and having an end plane perpendicular to the second axis, wherein the optical semiconductor element is disposed at a cross point of the first optical axis and the second axis.

2. The module according to claim 1, wherein the first optical axis and a second optical axis of the light-guiding body cross each other inside the light-guiding body.

3. The module according to claim 1, wherein the mounting portion includes pillar, and the first housing includes a cylindrical portion fitting the pillar.

4. The module according to claim 3, wherein the pillar has a first pillar and a second pillar, the first pillar having a first radius and a first height, the first pillar including groove on a side surface of the first pillar, the groove reaching a surface on an opposite side of the first surface, the second pillar coaxially connected with the first pillar and having a second radius and a second height, the second radius being smaller than the first radius; and the cylindrical portion has a third height larger than the first height and smaller than a sum of the first height and the second height, the cylindrical portion has a convex portion at a position higher than the first height, the convex portion being easy to fit the groove and be removed from the groove.

5. The module according to claim 4, wherein the plurality of grooves are provided dispersively in a circumferential direction of the first pillar, one of the grooves having a shape different from shapes of the remaining grooves, and the plurality of convex portions are provided dispersively in a circumferential direction of the cylindrical portion, one of the convex portions having a shape different from shapes of the remaining convex portions.

6. The module according to claim 1, further comprising:

a body including a second housing and a divider plate, the second housing having a third axis, a third surface and a concave portion, the third surface inclining to the third axis at a third angle, the concave portion being on the third surface, the divider plate being provided inside the concave portion and being parallel to the second surface, the divider plate holding the optical unit.

7. The module according to claim 6, wherein the base has a plurality of projections, the projections provided on a side opposite to the first side; and the divider plate has a plurality of openings, the projections passing through the openings.

8. The module according to claim 6, wherein the third angle is a complementary angle of the first angle.

9. The module according to claim 1, further comprising:

a body including a second housing and a movable plate, the second housing having a third axis, a third surface and a concave portion, the third surface inclining to the third axis at a third angle, the concave portion being on the third surface and having an arc shaped cross section, the movable plate being provided inside the concave portion, an angle between the movable plate and the third surface being variable, the movable plate holding the optical unit.

10. The module according to claim 9, wherein the second housing has convex ridges on the inner surface of the concave portion; and the movable plate turns little by little along the convex ridges.

11. The module according to claim 9, wherein the base has a plurality of projections, the projections provided on a side opposite to the first side; and the movable plate has a plurality of openings, the projections passing through the openings.

12. The module according to claim 9, wherein the third angle is a complementary angle of the first angle.

13. The module according to claim 1, wherein a dome shaped resin is provided on the first surface of the mounting portion so as to cover the optical semiconductor element.

14. The module according to claim 1, wherein the optical semiconductor element is a light-emitting element or a light-receiving element.

* * * * *